United States Patent
Rysgaard

Patent Number: 6,082,075
Date of Patent: Jul. 4, 2000

[54] FIBER REINFORCED STRUCTURAL SUPPORT MEMBER

[76] Inventor: Thomas A. Rysgaard, 21877 Harrow Ave., N., Forest Lake, Minn. 55025

[21] Appl. No.: 08/161,650

[22] Filed: Dec. 2, 1993

[51] Int. Cl.[7] .................... F04G 21/14; B28B 7/32
[52] U.S. Cl. .................. 52/745.2; 52/82; 52/731.2; 52/732.1; 52/745.08; 264/314
[58] Field of Search ................ 52/2.15, 309.1, 52/731.2, 731.3, 731.4, 732.1, 732.3, 2.18, 82, 86, 745.1, 745.2, 63, 745.07, 745.08, 745.09; 264/258, 314

[56] References Cited

U.S. PATENT DOCUMENTS

| | | | |
|---|---|---|---|
| Re. 25,241 | 9/1962 | Randolph | 264/258 |
| 3,475,768 | 11/1969 | Burton | 52/82 |
| 3,574,104 | 4/1971 | Medler | 264/258 |
| 3,610,563 | 10/1971 | Allen | 249/65 |
| 3,766,573 | 10/1973 | Burkholz et al. | 52/82 |
| 3,813,837 | 6/1974 | McClain et al. | 52/309.1 |
| 3,961,012 | 6/1976 | DiMaio | 264/257 |
| 4,159,603 | 7/1979 | Schroeder | 52/82 |
| 4,160,005 | 7/1979 | Renkowsky | 264/137 |
| 4,168,194 | 9/1979 | Stiles | 156/166 |
| 4,275,534 | 6/1981 | Porter | 52/82 |
| 4,400,927 | 8/1983 | Wolde-Tinase | 52/745 |
| 4,437,987 | 3/1984 | Thornton et al. | 210/137 |
| 4,509,302 | 4/1985 | Donatelli | 52/82 |
| 4,541,210 | 9/1985 | Cook | 52/82 |
| 4,642,962 | 2/1987 | Walter | 52/82 |
| 4,678,157 | 7/1987 | Fondiller | 264/314 |
| 4,720,947 | 1/1988 | Yacoboni | 52/81 |
| 4,746,471 | 5/1988 | Hale | 264/314 |
| 4,784,172 | 11/1988 | Yacoboni | 135/87 |
| 4,795,666 | 1/1989 | Okada et al. | 428/71 |
| 4,838,292 | 6/1989 | Allen | 52/82 |
| 4,852,599 | 8/1989 | McNamara | 52/86 |
| 4,883,625 | 11/1989 | Glemet et al. | 264/136 |
| 4,885,879 | 12/1989 | Plantier | 52/86 |
| 4,901,484 | 2/1990 | Santosuosso | 52/86 |
| 4,927,579 | 5/1990 | Moore | 264/101 |
| 4,986,948 | 1/1991 | Komiya et al. | 264/257 |
| 5,026,514 | 6/1991 | Hauwiller et al. | 264/258 |
| 5,043,128 | 8/1991 | Umeda | 264/258 |
| 5,084,222 | 1/1992 | Glemet et al. | 264/136 |
| 5,098,624 | 3/1992 | Smith et al. | 264/119 |
| 5,221,391 | 6/1993 | Kittaka et al. | 264/258 |

OTHER PUBLICATIONS

Fiberglass Structures & Tank Co., Inc. (FST) Brochure.

*Primary Examiner*—Michael Safavi
*Attorney, Agent, or Firm*—Janet Peyton Schafe

[57] ABSTRACT

A structural support member formed of a plurality of tubular members positioned to shape the structural support member in a desired form, e.g., an arched form. The positioned tubular members are permanently affixed to a base plate at one end and a nose plate at the other end, and the combination is layered by fiber-reinforced material to form the structural support member. Assembled plurality of structural support members can be interconnected to form a skeleton which can support a cover. Custom-sized structural support members are produced without the need for a mold. An additional embodiment utilizes an inflatable bladder as a mold around which the fiber-reinforced material is layered, the bladder then being deflated, removed, and reused. Custom-sized structural support members are thus produced in any shape desired and can also be assembled in group to form a skeleton which supports a cover.

4 Claims, 3 Drawing Sheets

FIBER REINFORCED STRUCTURAL SUPPORT MEMBER

BACKGROUND

This invention relates to construction members and is particularly concerned with structures of the type where interconnecting construction members support a fabric or film skin. The invention is particularly concerned with novel structural support members, or ribs, and methods of making them.

Fiber-reinforced plastics (hereinafter, "FRP") are well known as construction materials, specifically beams, ribs, bars, posts, rods, etc. These composites are widely used in industrial and automotive applications. Various fibers, including glass, carbon, nylon, polyester, and Kevlar® fibers, have been developed for use in FRP. These fibers have been used in various forms, including filaments, yarns, mats, woven roving, and chopped strand. The strength of the fiber is utilized through the transmittal of load by a resin. Common resins used are vinyl ester, polyester and epoxy resin. Present practice includes the concurrent application of resin and fiber in forming FRP materials.

Current practice teaches various methods of producing and shaping FRP into beams, ribs and the like. Most current methods include use of a mold to form sections of FRP. In some commercial structures, elongated rigid ribs are formed from FRP by pultrusion, extrusion, injection molding, progressive molding, press molding, or contact molding. In most domed structures, ribs, extending radially from a central rib, are formed of hinged sections, so that the dome is not smoothly curved. These domed structures are used as covers for swimming pools, municipal sewage digesters, etc. Current contact molding practice utilizes a standard set of molds, e.g. "small", "medium", and "large", to construct building roofs entirely of FRP. In, for example, domed structures, triangular-shaped sections of FRP, with ribs as reinforcing means incorporated within the FRP sections, are used. Both the rib and "skin" are of FRP. One longitudinal edge of these FRP sections, being a relatively smaller rib, interconnects with the adjoining FRP section forming a hinge, the larger rib overlapping the relatively smaller rib thus doubling the rib and increasing the load resistance of the structure roof but also increasing the expense of producing the roof.

In arched structures, ribs generally extend in paired fashion from a central "ridge pole." Again, where the entire roof is of FRP and the ribs interconnect in similar fashion, a large quantity of FRP is utilized. Presently, a standard set of molds is used to avoid the considerable expense of custom-sizing these structures. As a result, the final arcuate structure may be larger than necessary, resulting in the use of excess material and increased cost.

A further shortcoming of the existing technology is the shipping constraint preventing overland transport from exceeding 11 feet widths. While it is not impossible to transport items exceeding 11 foot widths, it is much more expensive to do so. With dome construction, the triangular-shaped FRP sections, the longitudinal sides thereof being the rib support radiating out from a central hub, the lateral edge or edge opposite the hub between the longitudinal edges, can be no wider than 11 feet for economical overland transport. Additional sections are sometimes required because, although larger sections would be adequate to support the load, the sections would be too wide to be economically transported overland. Therefore, the individual sections must be manufactured in smaller width dimensions to allow for economic overland transport, increasing the number of sections and increasing use of FRP in manufacturing the interconnections.

For the foregoing reasons, there is a need for structural support members that can be custom-sized, more economically produced because they minimize the use of construction materials, and more economically transported because they do not exceed the 11 foot width limitation.

SUMMARY

The present invention is directed to a structural support member that satisfies these needs. A structural support member having features of the present invention comprises a rigid integument of fiber-reinforced material and a means for shaping the rigid integument into the desired shape. Additionally, it provides novel ribs having particular utility for use in domed structures, arcuate-shaped structures, and "flat" structures. One embodiment of these novel ribs has a number of flexible tube-shaped members that are held, in a generally parallel position relative to each other, inside the rigid integument.

A second embodiment of the novel rib has an inflatable bladder that, when positioned in a pre-determined position, functions as a mold around which the fiber-reinforced material is layered and hardened, forming the rigid integument.

These structural support members, or ribs, can be interconnected to form a skeleton that supports a fabric or film skin. These ribs can be manufactured inexpensively in almost any desired size and shape, so that a minimum amount of ribs and fabric will be required on the job.

An important advantage of the present invention is the total variability in size and shape in which these structural support members can be produced. The length of the structural support member is totally variable as is the arch formed into the structural support member. Additionally, the strength of the structural support member can be increased to support additional "load" by increasing the diameter of the structural support member itself by either increasing the number of layers of fiber-reinforced material, or, in the first embodiment, increasing the spacing between the tubular members, or a combination of both means of increasing the diameter of the support member.

A further advantage of the first embodiment is that no molds need be manufactured or stored. In the first embodiment, the means for molding and shaping the structural support member are encased by and become incorporated to the structural support member itself.

BRIEF DESCRIPTION OF THE DRAWINGS

Understanding of the invention will be enhanced by referring to the accompanying drawings, in which like numbers refer to like parts in the several views and in which.

DETAILED DESCRIPTION OF THE PREFERRED EMBODIMENTS

Understanding of the invention will be further enhanced by referring to the following illustrative but nonlimiting examples.

Figure 1:
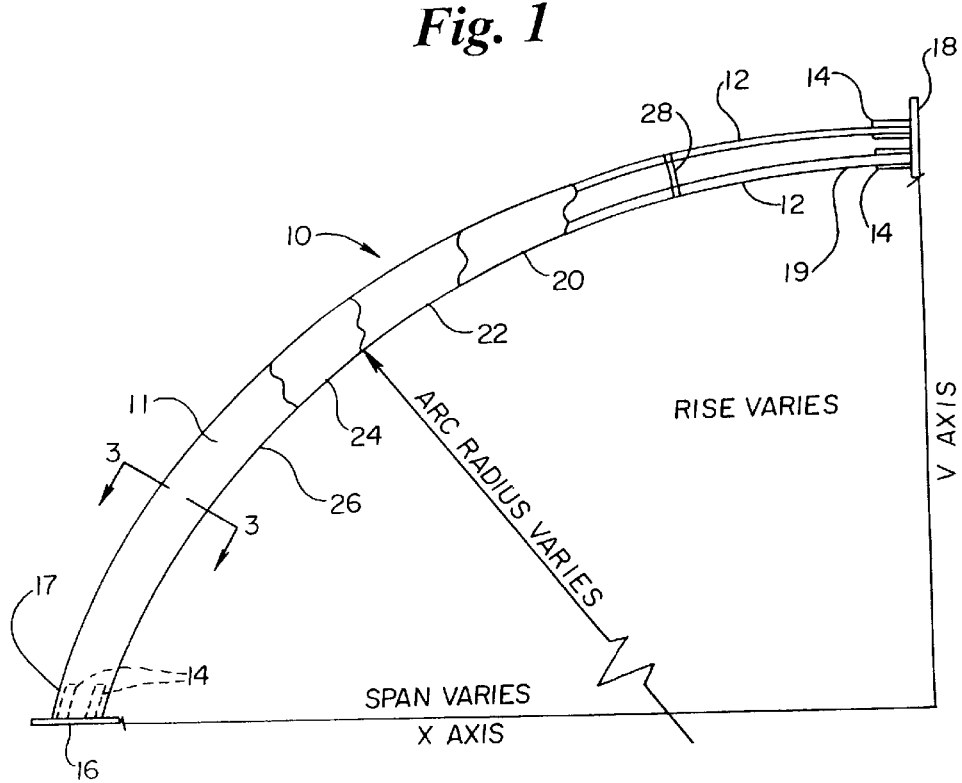
FIG. 1 is a side elevational view of a structural member made in accordance with the invention, with portions broken away to enhance understanding, also indicating the manner of making the structural member.

As shown in FIG. 1, a first embodiment of a structural support member 10 comprises an integument 11 formed of multiple layers of fiber-reinforced material, such as FRP. Internally of the integument is a plurality of tubular members 12, positioned to form a pre-determined arch. A plurality of tube sockets 14 receive and fixedly attach the tubular members 12 to either a base plate 16 at the proximal ends 17 of the tubular members 12 or a nose plate 18 at the distal ends 19 of the tubular members 12. Shaping plates 28 position tubular members 12 intermediate base plate 16 and nose plate 18. Fiber-reinforced material, generally fiber-reinforced plastic (FRP) is layered 20,22,24,26 around the positioned tubular members 12 which when hardened, forms the integument 11.

The first layer 20 is a shaping layer, of sheet material, which when stretched around the tubular members 12 provides a surface by which the remaining layers 22,24,26 are supported. Additional layers of FRP can be added as needed.

Figure 7:
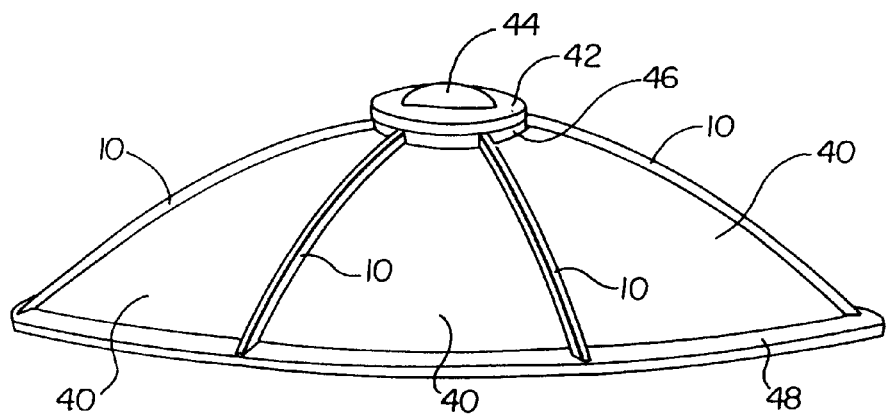
FIG. 7 is a perspective view of a dome-shaped structure utilizing novel ribs of this invention.
Figure 8:
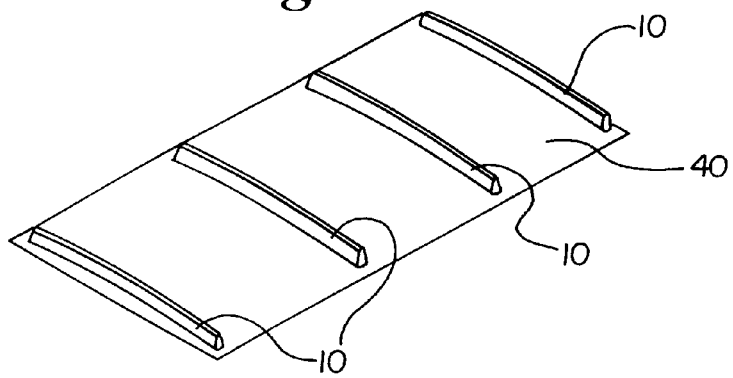
FIG. 8 is a perspective view of a flat structure utilizing novel ribs of this invention.

The tubular members 12 are positioned to achieve a predetermined shape of the structural support member 10. Structural support members 10 are used as support "ribs" or beams that are interconnected and assembled to provide the supporting skeleton for a roof, or fabric or film skin e.g. 40 illustrated at FIGS. 7, 9. Structural support members 10 are assembled in parallel relationship to form a "flat" roof, as shown at FIG. 8.

In constructing the structural support members 10 of the first embodiment, tubular members 12, manufactured in standard lengths, may be joined without affecting the strength of the resulting structural support member 10. The tubular members 12 are used to give form and shape, not strength, to structural support member 10. Any strength added by the tubular members 12 to the structural support member 10 is supplementary to the strength achieved from wrapping FRP layers, 20,22,24,26, around the tubular members 12 as shown in FIG. 1. However, additional strength can be achieved by adding layers of FRP to either embodiment as needed. Additional strength may also be added to the structural support members 10 of the first embodiment by increasing space between the tubular members, not shown, thereby increasing the diameter of the structural support member 10. Tubular members 12 of polyvinyl chloride, or PVC, have been used; however, other types of tubing could be used. PVC tubing of 2-inch diameter has been found to be adequately flexible for bending into the desired shape while retaining appropriate rigidity to hold the shape; however, other materials with like properties could be used.

In actual use conditions, four tubes have been employed with best results, however, structural support members 10 using two tubes, three tubes, five tubes or more have been envisioned. Since the addition of greater numbers of tubular members has minimal effect on the strength of the structural support member 10, it is felt that the numbers of tubular members used are incidental to the structure. The load-bearing portion of the structural support member 10 is located toward the distal end 19 thereof. The structural support member 10 may be strengthened at this load-bearing portion by the addition of supplementary layers of FRP in this region of the structural support member 10.

Figure 2:
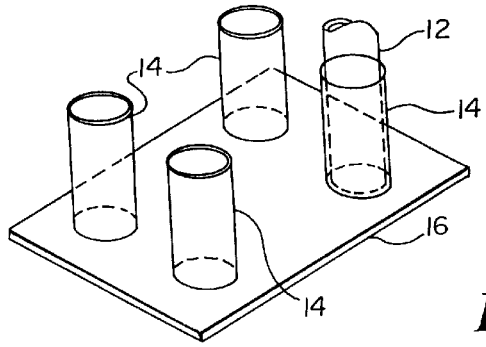
FIG. 2 is a perspective view of the base plate of FIG. 1.
Figure 4:
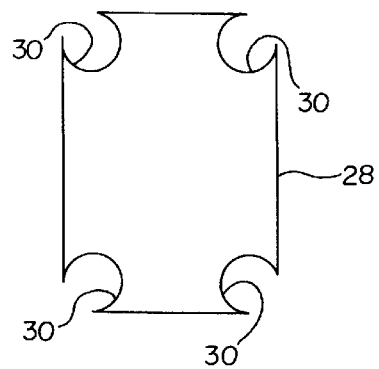
FIG. 4 is a plan view of a shaping plate of FIG. 1.

The shaping of the structural support member 10 of the first embodiment is accomplished by positioning tubular members 12 between base plate 16, shown in detail at FIG. 2, and nose plate 18, not shown in detail but generally similar to FIG. 2. The tubular members 12 may be flexed or curved intermediate the ends thereof, being tensioned into the pre-determined arch; base plate 16 receiving the proximal ends 17 of tubular members 12 and nose plate 18 receiving the distal end 19 of tubular members 12. The shaping plate 28, shown in detail at FIG. 4, is put into place at a position intermediate nose plate 18 and base plate 16. Additional shaping plates can be used as needed. In this manner, the pre-determined arch in the structural support member 10 is maintained in the assembled structural support member 10.

In the first embodiment, the nose plate 18 and base plate 16 and their associated tube sockets 14, are fashioned from sections of the flexible tubing, such as PVC, cut at a predetermined angle at one end and temporarily fastened to a plate, not shown. This plate is usually of plywood or similar material easily cut to shape and inexpensive to use. Fiber-reinforced material, such as FRP, with associated resin, is wrapped around these sections of cut PVC and plywood base. After the FRP "sets up", or hardens, the PVC sections and plywood base are removed, the remaining structure becomes the base plate 16 or nose plate 18. Except in the case of manufacture of a hemispherical roof or cover, the base plate angle and the nose plate angle will be different.

Because the tube sockets 14 are formed around PVC sections, they exactly fit the tubular members there received. The nose plate 18 is formed in the same manner as the base plate 16 and results in a structure similar to that of FIG. 2. However, as previously stated, the angle of the pre-cut PVC mold, may be a different angle from that of the base plate mold.

Once the nose plate 18 and base plate 16 with tube sockets 14 are formed, they are placed in a stationary position, on a table or the like, to support the structural support member 10 during manufacture thereof. The positioned tube sockets 14 shape the resulting structural support member 10 by holding the tubular members 12 at the ends thereof in a predetermined position.

Shaping plates 28 are positioned intermediate the nose plate 18 and base plate 16 on each structural support member 10. The shaping plates 28 maintain the generally parallel positions of the tubular members 12 relative to each other. Apertures 30 are cut into the shaping plates 28 to accommodate passage of the tubular members 12 therethrough. Plywood may be used for shaping plates 28, again because of cost as well as ease of cutting and drilling but other flat, rigid materials could be utilized for the shaping plates 28.

Figure 3:
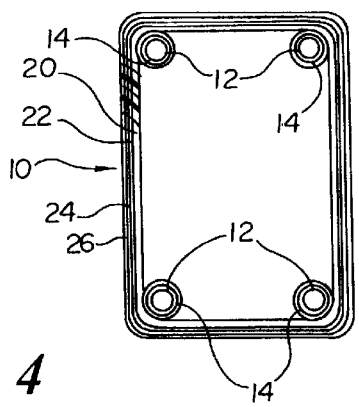
FIG. 3 is a cross-sectional view taken along the lines 3—3 of FIG. 1.

Once the tubular members 12 are positioned, the first layer 20 of FRP, of sheet material, is applied with a resin, and performs the function of a shaping wrap. It is envisioned that an alternative wrap, e.g. plastic, could be used. The shaping wrap provides a base to apply the other layers of FRP to. The layers of FRP 20,22,24,26, shown in detail at FIG. 3, enclose tubular members 12 and, when hardened, form the integument 11.

Figure 5:
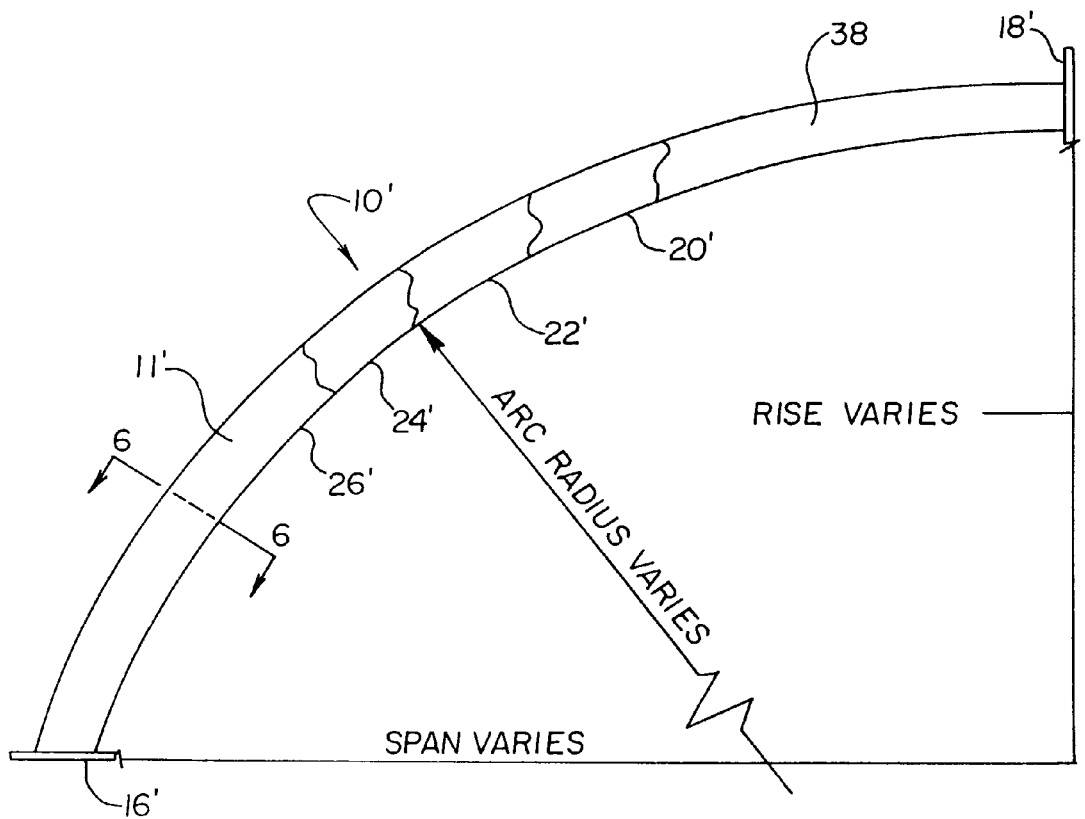
FIG. 5 is a side elevational view of a second embodiment of the invention as a whole, with portions broken away for ease of understanding.
Figure 6:
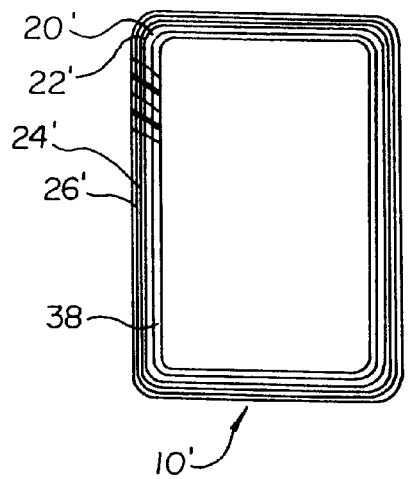
FIG. 6 is a cross-sectional view taken along the lines 6—6 of FIG. 5.
Figure 9:
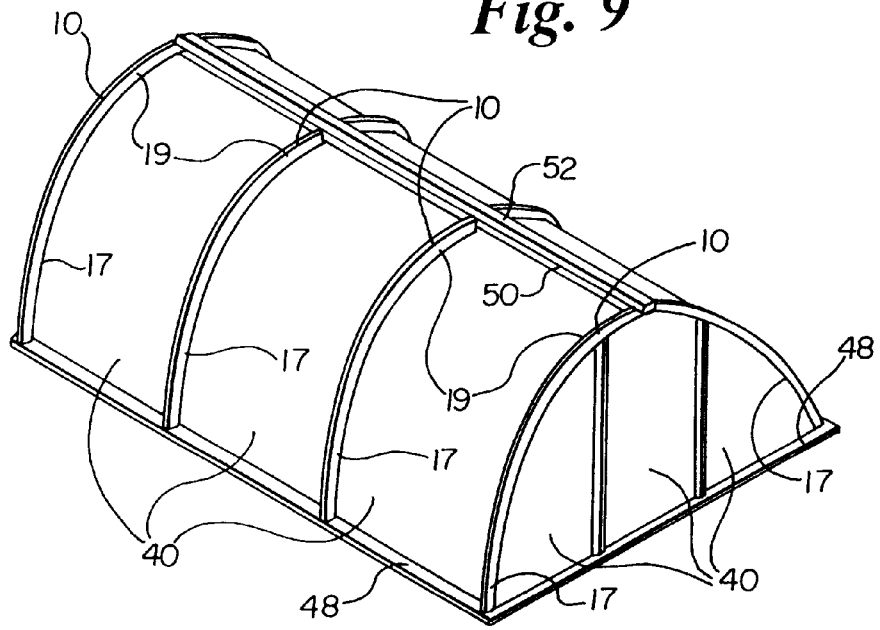
FIG. 9 is a perspective view of an arch-shaped structure utilizing novel ribs of this invention.

A second embodiment, illustrated at FIGS. 5 and 6, utilizes a bladder 38 around which FRP, or the like, is layered 20',22',24', 26' and, when hardened, forms an integument 11' which, with the addition of a base plate 16' and a nose plate 18', become the structural support member 10'. Structural support members 10' formed in this manner can be shaped in any pre-determined size, thickness and arch and can be combined and or interconnected to form a skeleton for the support of a fabric or film skin in building shapes such as illustrated at FIGS. 7, 8, and 9, as described previously for the first embodiment. The structural support members 10' take on the shape of the inflated bladder; namely, if the bladder is banana-shaped, so is the structural member 10', if the bladder is linear, the structural support member 10' also is generally linear in shape. During formation of the structural support members of the second embodiment, both ends are open to allow access to the bladder for inflation and removal thereof. Both base plate 16' and nose plate 18' are flanges of FRP and are formed at the time of forming the integument 11'. The second embodiment can be made into the same shapes as the first embodiment, namely, as illustrated at FIGS. 7, 8, and 9. The curvature of the rib 10' can be adjusted, illustrated at FIG. 5, as can rib 10 in the first embodiment, illustrated at FIG. 1. The appearance of the second embodiment in use is the same as the appearance of the first embodiment. Both embodiments function similarly. The second embodiment works particularly well with small sized structures because it saves the labor time to construct the mold, and it saves materials.

The layers 22, 24, 26 of the first embodiment, and 22',24',26' in the second embodiment, are alternating layers of woven roving and chopped strand applied concurrently with a resin. In these embodiments, resin-coated chopped strand is blown onto the structural support member while the woven roving is wrapped and then sprayed with resin.

Frequently used resins in the formation of fiber-reinforced plastics are: polyester resin, vinyl ester resin, and epoxy resin. The choice of resin is dependant on the desired properties of the structural support member. Obviously, over a highly acidic vat or other container, the resin with the highest chemical resistance is chosen.

The chosen resin is applied during application of the fiberglass layers 20,22,24,26 to either embodiment.

A primary objective is to produce arch-shaped structural support members 10,10' to form a covering for a structure, namely a roof. The amount of the arch inherent in the structural support members varies between FIGS. 7, 8, and 9.

The domed-shaped structure, shown generally at FIG. 7, utilizes the structural support members 10 extending radially from a central ring 46. The structural support members 10 are attached to ring 46 by bolts, screws, or other fastening means, however, any similar means of connecting support member ends in like fashion could be used. The central ring 46 receives multiple nose plate ends, not shown, of the structural support members 10. The interconnected structural support members 10 support a fabric or film skin 40 (e.g. of vinyl-coated nylon cloth). The central ring 46 is shown combined with a hub 42 and hub cap 44 to interconnect the structural support members 10. The dome-shaped structure is mounted, by means of a base plate 16, to the perimeter 48 of the structure to be covered by bolts, screws or other fastening means.

A "flat" structure, shown generally at FIG. 8 utilizes structural support members 10 supporting a skin 40 for providing a relatively flat covering for a structure. There is a slight convexity or arching incorporated into the structural support members 10 of this "flat" structure. The structural support members 10 of this structure covering are not interconnected but aligned in a parallel relationship. The covering, or skin 40, is fastened by fastening means such as screws, nuts and bolts or the like, not shown, around the perimeter of the structure.

FIG. 9 illustrates use of the novel ribs to form a skeleton of an arcuate-shaped structure. Again structural support members 10 support a skin 40 forming the covering. The structural support members 10 are fastened to a central ridge 50 at their distal ends 19. Their proximal ends 17 are supported and permanently affixed to the perimeter 48 of the structure to be fastened by nuts, bolts, or other fastening means.

In forming either embodiment of structural support member 10, 10' the dimensions of the structure to be covered are ascertained. The load compression requirements are determined including environmental needs (whether there is snow in winter, high winds prevalent, extreme sun exposure, if the contents of the structure to be covered requires chemical resistant feature in the covering material and head room or opening size above the structure to be covered all play a factor).

This information is used to determine support length, interior height within the structure, wall thickness, and rib or beam arch. Increasing the interior diameter of the structural support member increases its inherent strength. Additionally, adding additional layers of FRP also increases the strength of the structural support member. The span, the distance across the structure to be covered and the rise, the maximum height above the structure wall, are variable to allow for a custom-sized covering for a great variety of structures.

The previously described first embodiment of the present invention has many advantages, including the fact that no molds must be manufactured or stored. The means for forming or shaping the support member are encased by and become included in the structural support member itself.

The previously described second embodiment of the present invention has the advantage that, although a mold is formed and utilized, this mold is of flexible material that is inexpensive to produce, reused and may be folded for storage.

Where a series of structures is to be covered, for example, municipal sewage digesters, use of either embodiment results in a more uniform and therefore a more aesthetically pleasing appearance.

A result of utilizing this structural support member system is a custom-sized structural covering that is more economically produced because less FRP is used. The costs are further reduced because the cost of shipping is reduced.

A further advantage is that the custom-sized structures incorporate enough strength to meet the load compression requirements of the job but don't exceed these requirements as the former method did when utilizing the "small/medium/large" concept.

The second embodiment of the novel ribs of the present invention comprises a rigid integument 11' of fiber-reinforced material molded around an inflatable bladder 38. The fiber-reinforced material is layered, 20',22',24',26' around the inflatable bladder 38, which when hardened, forms the structural support member 10'. The bladder 38 is later deflated, removed and reused. Because the bladder 38 may be fashioned in any predetermined dimensions, the structural support member of this embodiment is easily custom-sized. The bladder is formed of material that can be shaped and made air-tight by use of heat-sealing the seams or similar method. The FRP layered around the inflated bladder takes on the shape of the bladder. Ribs of this embodiment can also be interconnected to form a skeleton that supports a fabric or film skin in the manner described previously and illustrated at FIGS. 7, 8, and 9.

The result of utilizing this structural support member 10' is a custom-sized structural covering where only the structural support members 10', themselves are made of FRP resulting in a more economically produced structural support member 10'. The costs are further reduced because the cost of shipping is reduced as previously described for the first embodiment. These ribs are much smaller than the 11 foot maximum widths. Also, the skin the structural support members supports is made of a fabric that may be folded for storage. Thus where several trucks would be needed to transport an entire roof system under previous FRP construction practices, by using the structural support members and method described herein, an entire roof structure may be shipped by using only one truck. Significant transportation costs would be avoided, as described above. Rather than using multiple sections of FRP roofing with an 11 foot limitation, the present invention provides a structural support member of FRP that never approaches the 11 foot limit. The structural support members of the present invention support a fabric skin that results in a need for fewer structural support members because there is less weight to support. The dead weight of a roof so constructed is less because there is a skin of vinyl encased nylon held up by the structural support members rather than an entire section of FRP. Only the structural support members themselves are of rigid FRP; the skin is of flexible fabric which may be folded for transport. The structural support members can be constructed in widths adequate for the strength required but narrower than the 11 foot limit providing a significant savings in transportation costs.

Although the present invention has been described in considerable detail with reference to certain currently preferred versions thereof, other versions are possible. Therefore, the spirit and scope of the appended claims should not be limited to the description of the preferred versions contained herein.

What is claimed is:

1. A method of manufacturing a skeleton for supporting a fabric skin, the skeleton comprising a series of interconnected structural support members, the method comprising:

a) providing an inflatable bladder, of predetermined dimensions;

b) inflating the bladder to a pressure at which its sides are rigid;

c) layering fiber reinforced plastic around the inflated bladder to a pre-determined thickness;

d) curing the fiber reinforced plastic;

e) deflating the bladder;

f) removing the bladder leaving a hardened integument which is used as one of the structural support members; and g) interconnecting a series of structural support members forming a skeleton for supporting a fabric skin.

2. The method of claim 1, wherein the series of structural support members in step (g) are interconnected at a first end of each to a base, and the series of structural support members extend generally radially from the base for forming a dome shaped skeleton.

3. The method of claim 1, further providing in step (g) positioning of the series of structural support members in a generally parallel position relative to each other, interconnecting the structural support members at a first end of each to a central structural support member functioning as a ridge pole, and interconnecting the structural support members at a second end of each to a second support, for forming a generally arcuate shaped structure.

4. A method of manufacturing a structural support member, comprising:

a) providing an inflatable bladder, of predetermined dimensions;

b) inflating the bladder to a pressure at which its sides are rigid;

c) layering fiber reinforced plastic around the inflated bladder to a pre-determined thickness;

d) curing the fiber reinforced plastic;

e) deflating the bladder; and f) removing the bladder leaving a hardened integument which is used as the formed structural support member.

\* \* \* \* \*